(12) United States Patent
Kido

(10) Patent No.: US 9,099,005 B2
(45) Date of Patent: Aug. 4, 2015

(54) ENVIRONMENT RECOGNITION DEVICE AND ENVIRONMENT RECOGNITION METHOD

(75) Inventor: Shinnosuke Kido, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 344 days.

(21) Appl. No.: 13/460,942

(22) Filed: May 1, 2012

(65) Prior Publication Data

US 2012/0288151 A1 Nov. 15, 2012

(30) Foreign Application Priority Data

May 12, 2011 (JP) ................................. 2011-107689

(51) Int. Cl.
*G06K 9/00* (2006.01)
*G08G 1/16* (2006.01)

(52) U.S. Cl.
CPC ............ *G08G 1/166* (2013.01); *G06K 9/00805* (2013.01); *G06K 9/00825* (2013.01); *G08G 1/165* (2013.01)

(58) Field of Classification Search
None
See application file for complete search history.

(56) References Cited

U.S. PATENT DOCUMENTS

2010/0074469 A1\* 3/2010 Nakamori et al. ............ 382/103

FOREIGN PATENT DOCUMENTS

| JP | 2000-261787 A | 9/2000 |
|---|---|---|
| JP | 3349060 B2 | 11/2002 |
| JP | 2010-224918 A | 10/2010 |
| JP | 2010-224925 A | 10/2010 |

OTHER PUBLICATIONS

Decision of Grant issued in Japanese Application No. 2011-107689 dated Oct. 1, 2013.
Notification of Reasons for Refusal issued in Japanese Application No. 2011-107689 dated Apr. 16, 2013.

\* cited by examiner

*Primary Examiner* — Atiba O Fitzpatrick
(74) *Attorney, Agent, or Firm* — McDermott Will & Emery LLP

(57) ABSTRACT

There are provided an environment recognition device and an environment recognition method. The environment recognition device provisionally determines a specific object corresponding to a target portion from a luminance of a target portion, groups adjacent target portions provisionally determined to correspond to a same specific object as a target object, derives a representative distance that is a representative value of the relative distance of target portions in the target object, and grouping the target portions as the target object, the target portions corresponding to the same specific object with respect to the target object and the luminance, when a difference in horizontal distance from the target object of the target portions and a difference in height from the target object of the target portions fall within a first predetermined range, a difference between the relative distance and the representative distance of target portions falls within a second predetermined range.

10 Claims, 13 Drawing Sheets

FIG. 4

| IDENTIFICATION NUMBER | | 1 | 2 | 3 | 4 | 5 | 6 | 7 | 8 |
|---|---|---|---|---|---|---|---|---|---|
| SPECIFIC OBJECT | | TRAFFIC LIGHT (RED) | TRAFFIC LIGHT (YELLOW) | TRAFFIC LIGHT (BLUE) | TAIL LAMP (RED) | TURN SIGNAL (ORANGE) | ROAD TRAFFIC SIGN (RED) | ROAD TRAFFIC SIGN (BLUE) | ROAD TRAFFIC SIGN (GREEN) |
| LUMINANCE RANGE | RED | ≥150 | ≥150 | ≤50 | ≥200 | ≥100 | ≥100 | ≤50 | ≤100 |
| | GREEN | ≤100 | ≥100 | ≥150 | ≤50 | ≤60 | ≤60 | ≤50 | ≥150 |
| | BLUE | ≤50 | ≤50 | ≥100 | ≤50 | ≤50 | ≤50 | ≥200 | ≤100 |
| WIDTH RANGE (m) | | 0.2 TO 0.4 | 0.2 TO 0.4 | 0.2 TO 0.4 | 0.1 TO 0.2 | 0.1 TO 0.2 | 0.3 TO 1.0 | 0.3 TO 1.0 | 0.3 TO 1.0 |

ENVIRONMENT RECOGNITION DEVICE AND ENVIRONMENT RECOGNITION METHOD

CROSS-REFERENCE TO RELATED APPLICATIONS

The present application claims priority from Japanese Patent Application No. 2011-107689 filed on May 12, 2011, the entire contents of which are hereby incorporated by reference.

BACKGROUND OF THE INVENTION

1. Field of the Invention

The present invention relates to an environment recognition device and an environment recognition method for recognizing a target object based on a luminance of the target object in a detection area.

2. Description of Related Art

Conventionally, a technique has been known that detects a target object such as an obstacle including a vehicle and a traffic light located in front of a subject vehicle for performing control to avoid collision with the detected target object and to maintain a safe distance between the subject vehicle and the preceding vehicle (for example, Japanese Patent No. 3349060 (Japanese Patent Application Laid-Open (JP-A) No. 10-283461)).

Further, in such techniques, there is a technique that performs more advanced control. Specifically, it not only specifies a target object simply as a solid object, but further determines whether the detected target object is a preceding vehicle that is running at the same speed as the subject vehicle or a fixed object that does not move. In this case, when the target object is detected by capturing an image of a detection area, it is necessary to extract (cut out) the target object from the captured image before specifying what the target object is.

For example, in the case that the captured image is a color image, there may be a method for grouping a set of pixels having a same luminance (color) and extracting them as a target object.

However, when color or sizes of a character and a graphic, which are displayed on a light emitting traffic sign or a digital signage, are similar to those of a lighting portion of a traffic light, simply grouping the plural pixels having the similar color characteristics may cause the character and the graphic to be falsely recognized as the traffic light. Even if an indicator is larger than the lighting portion of the traffic light, a displayed character and a graphic are not always continuously drawn depending on a display mode of the indicator, and may be separately grouped. As a result, the character and the graphic are unlikely to be recognized as being displayed on the same substance.

The present invention has been devised in order to solve the above problem and an object thereof is to provide an environment recognition device and an environment recognition method that are capable of improving the accuracy of specifying of a target object.

SUMMARY OF THE INVENTION

In order to solve the above problems, an aspect of the present invention provides an environment recognition device that includes: a data retaining unit that retains a range of luminance in association with a specific object; a luminance obtaining unit that obtains a luminance of a target portion in a detection area of an image; a specific object provisional determining unit that provisionally determines the specific object corresponding to the target portion from the luminance on the basis of the association retained in the data retaining unit; a target portion grouping unit that groups, as a target object, adjacent target portions provisionally determined to correspond to a same specific object; a position information obtaining unit that obtains a relative distance of the target portion; a representative distance deriving unit that derives a representative distance that is a representative value of the relative distance of each target portion in the target object; and a target object grouping unit that groups another target portion, between which and the target object differences in the horizontal and the vertical direction fall within a first predetermined range respectively and between whose relative distance and the representative distance of the target object a difference falls within a second predetermined range and whose luminance corresponds to the luminance of the target object, into the same target object.

The target object grouping unit may group plural target portions as a target object, when the plural target portions in the first predetermined range and the second predetermined range are adjacent to each other, and the number of target portions is not less than a predetermined number.

The target object grouping unit may regard the relative distance of the target portion which is grouped as the representative distance, and further group another target portion satisfying a condition as the target object, with the target portion being as a base point.

The representative distance may be a relative distance that corresponds to a peak of a distance distribution of the target portions in the target object.

The representative distance may be an average value of relative distances of the target portions in the target object.

In order to solve the above problems, another aspect of the present invention provides an environment recognition method that includes: obtaining a luminance of a target portion in a detection area of an image; obtaining a relative distance of the target portion; provisionally determining a specific object corresponding to the target portion from the luminance of the target portion on the basis or association between the luminance range and the specific object, the association being retained in a data retaining unit; grouping adjacent target portions provisionally determined to correspond to a same specific object as a target object; deriving a representative distance that is a representative value of the relative distance of target portions in the target object; and grouping another target portion, between which and the target object differences in the horizontal and the vertical direction fall within a first predetermined range respectively and between whose relative distance and the representative distance of the target object a difference falls within a second predetermined range and whose luminance corresponds to the luminance of the target object, into the same target object.

According to the present invention, the accuracy of specifying the target object can be improved, whereby false recognition can be avoided.

BRIEF DESCRIPTION OF THE SEVERAL VIEWS OF THE DRAWINGS

FIG. 4 is an explanatory diagram for explaining a specific object table;

DETAILED DESCRIPTION OF THE INVENTION

Figure 1:
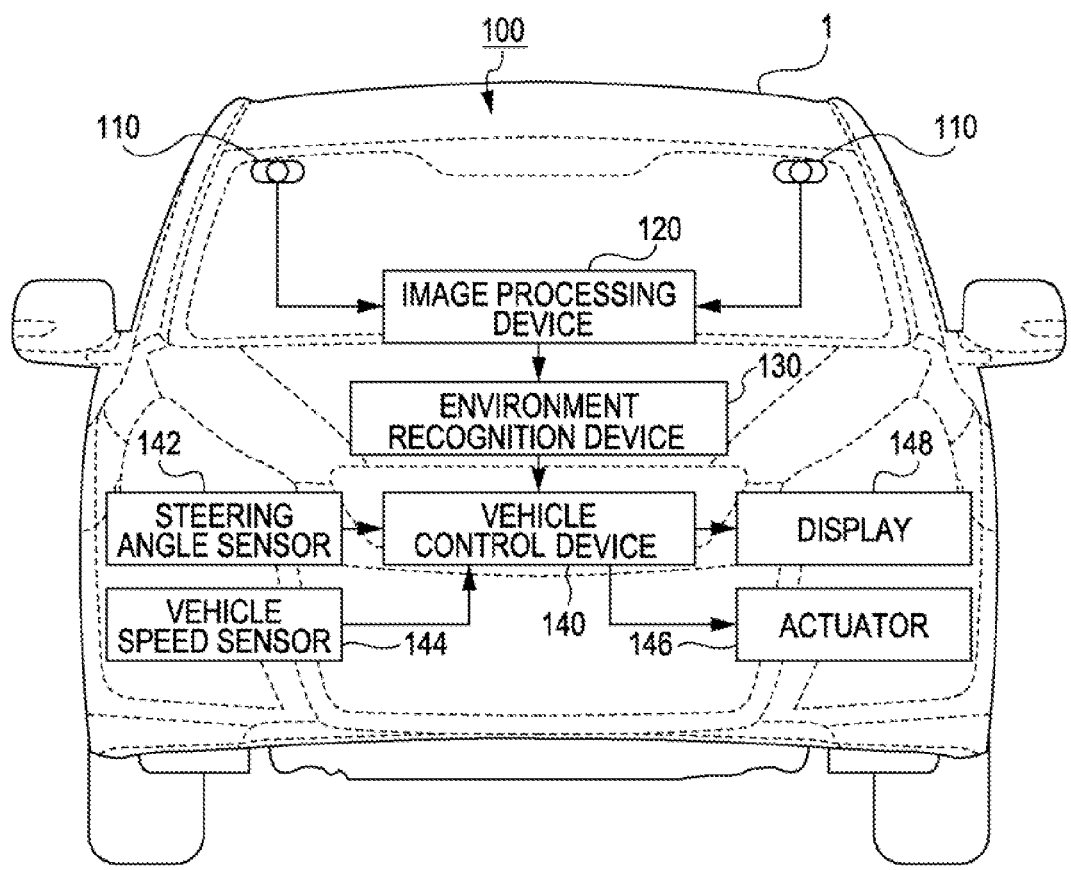
FIG. 1 is a block diagram illustrating a connection relationship in an environment recognition system.

A preferred embodiment of the present invention will be hereinafter explained in detail with reference to attached drawings. The size, materials, and other specific numerical values shown in the embodiment are merely exemplification for the sake of easy understanding of the invention, and unless otherwise specified, they do not limit the present invention. In the specification and the drawings, elements having substantially same functions and configurations are denoted with same reference numerals, and repeated explanation thereabout is omitted. Elements not directly related to the present invention are omitted in the drawings. (Environment Recognition System 100)

FIG. 1 is a block diagram illustrating connection relationship in an environment recognition system 100. The environment recognition system 100 includes a plurality of imaging devices 110 (two imaging devices 110 in the present embodiment), an image processing device 120, an environment recognition device 130, and a vehicle control device 140 that are provided in a vehicle 1.

The image capturing devices 110 include an imaging element such as a CCD (Charge-Coupled Device) and a CMOS (Complementary Metal-Oxide Semiconductor), and can obtain a color image, that is, a luminance consists of three color phases (red, green, blue) per pixel. In the present embodiment, color and luminance are dealt in the same way; if both wordings are included in one sentence, both can be read as luminance configuring color, or color having luminance. In this case, a color image captured by the imaging devices 110 is referred to as luminance image and is distinguished from a distance image to be explained later. The imaging devices 110 are disposed to be spaced apart from each other in a substantially horizontal direction so that optical axes of the two imaging devices 110 are substantially parallel in a proceeding direction of the vehicle 1. The imaging device 110 continuously generates image data obtained by capturing an image of a target object in a detection area in front of the vehicle 1 at every 1/60 seconds (60 fps), for example. In this case, the target object may be not only an independent three-dimensional object such as a vehicle, a traffic light, a road, and a guardrail, but also an illuminating portion such as a tail lamp, a turn signal, a traffic light that can be specified as a portion of a three-dimensional object. Each later-described functional unit in the embodiment performs processing in response to the update of such image data.

The image processing device 120 obtains image data from each of the two imaging devices 110, and derives, based on the two pieces of image data, parallax information including a parallax of any block (a set of a predetermined number of pixels) in an image and a position representing a position of the any block in an image. Specifically, the image processing device 120 derives a parallax using so-called pattern matching that searches a block in one of the image data corresponding to the block optionally extracted from the other image data. The block is, for example, an array including four pixels in the horizontal direction and four pixels in the vertical direction. In this embodiment, the horizontal direction means a horizontal direction of the captured image, and corresponds to the width direction in the real world. On the other hand, the vertical direction means a vertical direction of the captured image, and corresponds to the height direction in the real world.

One way of performing the pattern matching is to compare luminance values (Y color difference signals) between two image data by the block indicating any image position. Examples include an SAD (Sum of Absolute Difference) obtaining a difference of luminance values, an SSD (Sum of Squared intensity Difference) squaring a difference, and an NCC (Normalized Cross Correlation) adopting the degree of similarity of dispersion values obtained by subtracting a mean luminance value from a luminance value of each pixel. The image processing device 120 performs such parallax deriving processing by the block on all the blocks appearing in the detection area (for example, 600 pixels×200 pixels). In this case, the block is assumed to include 4 pixels×4 pixels, but the number of pixels in the block may be set at any value.

Although the image processing device 120 can derive a parallax for each block serving as a detection resolution unit, it is impossible to recognize what kind of target object the block belongs to. Therefore, the parallax information is not derived per target object, but is independently derived per detection resolution unit (for example, per block) in the detection area. In this embodiment, an image obtained by associating the parallax information thus derived (corresponding to a later-described relative distance) with image data is referred to as a distance image.

Figure 2A:
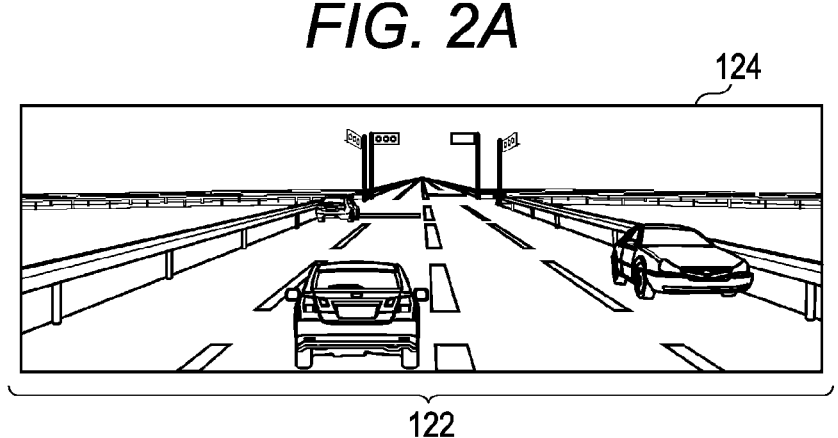
FIGS. 2A and 2B are explanatory diagrams for explaining a luminance image and a distance image.
Figure 2B:
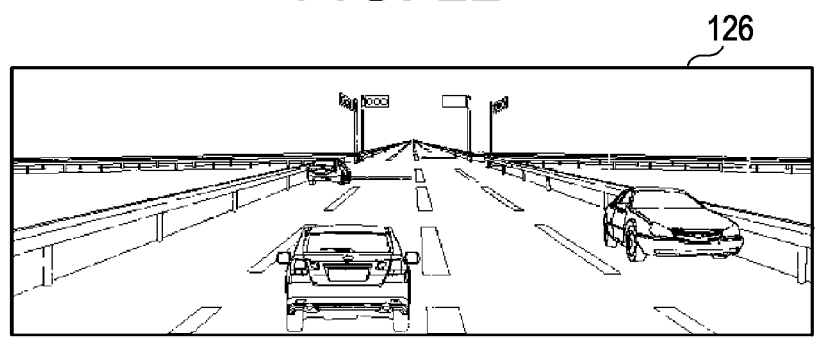

FIGS. 2A and 2B are explanatory diagrams for explaining a luminance image 124 and a distance image 126. For example, Assume that the luminance image (image data) 124 as shown in FIG. 2A is generated with regard to a detection area 122 by the two imaging devices 110. Here, for the sake of easy understanding, only one of the two luminance images 124 is schematically shown. In the present embodiment, the image processing device 120 obtains a parallax for each block from such luminance image 124, and forms the distance image 126 as shown in FIG. 2B. Each block of the distance image 126 is associated with a parallax of the block. In the drawing, for the sake of explanation, a block of which a parallax is derived is indicated by a black dot.

The parallax can be easily specified at an edge portion (portion where there is a large contrast difference between adjacent pixels) of an image, and therefore, the block from which parallax is derived, which is denoted with black dots in the distance image 126, is likely to also be an edge in the luminance image 124. Therefore, the luminance image 124 as shown in FIG. 2A and the distance image 126 as shown in FIG. 2B are similar in terms of outline of each target object.

The environment recognition device 130 obtains the luminance image 124 and the distance image 126 from the image processing device 120, and uses the luminances based on the luminance image 124 and a relative distance from the subject vehicle 1 based on the distance image 126 to determine which specific object the target object in the detection area 122 corresponds to. In this embodiment, the environment recognition device 130 uses a so-called stereo method to convert the parallax information for each block in the detection area 122 of the distance image 126 into three-dimensional position information including a relative distance, thereby deriving heights. The stereo method is a method using a triangulation method to derive a relative distance of a target object with respect to the imaging device 110 from the parallax of the target object. The environment recognition device 130 will be explained later in detail.

The vehicle control device 140 avoids a collision with the target object specified by the environment recognition device 130 and performs control so as to maintain a safe distance from the preceding vehicle. More specifically, the vehicle control device 140 obtains a current cruising state of the vehicle 1 based on, for example, a steering angle sensor 142 for detecting a steering position and a vehicle speed sensor 144 for detecting a speed of the vehicle 1, thereby controlling an actuator 146 to maintain a safe distance from the preceding vehicle. The actuator 146 is an actuator for vehicle control used to control a brake, a throttle valve, a steering angle and the like. When collision with a target object is expected, the vehicle control device 140 displays a warning (notification) of the expected collision on a display 148 provided in front of a driver, and controls the actuator 146 to automatically decelerate the vehicle 1. The vehicle control device 140 can also be integrally formed with the environment recognition device 130.

(Environment Recognition Device 130)

Figure 3:
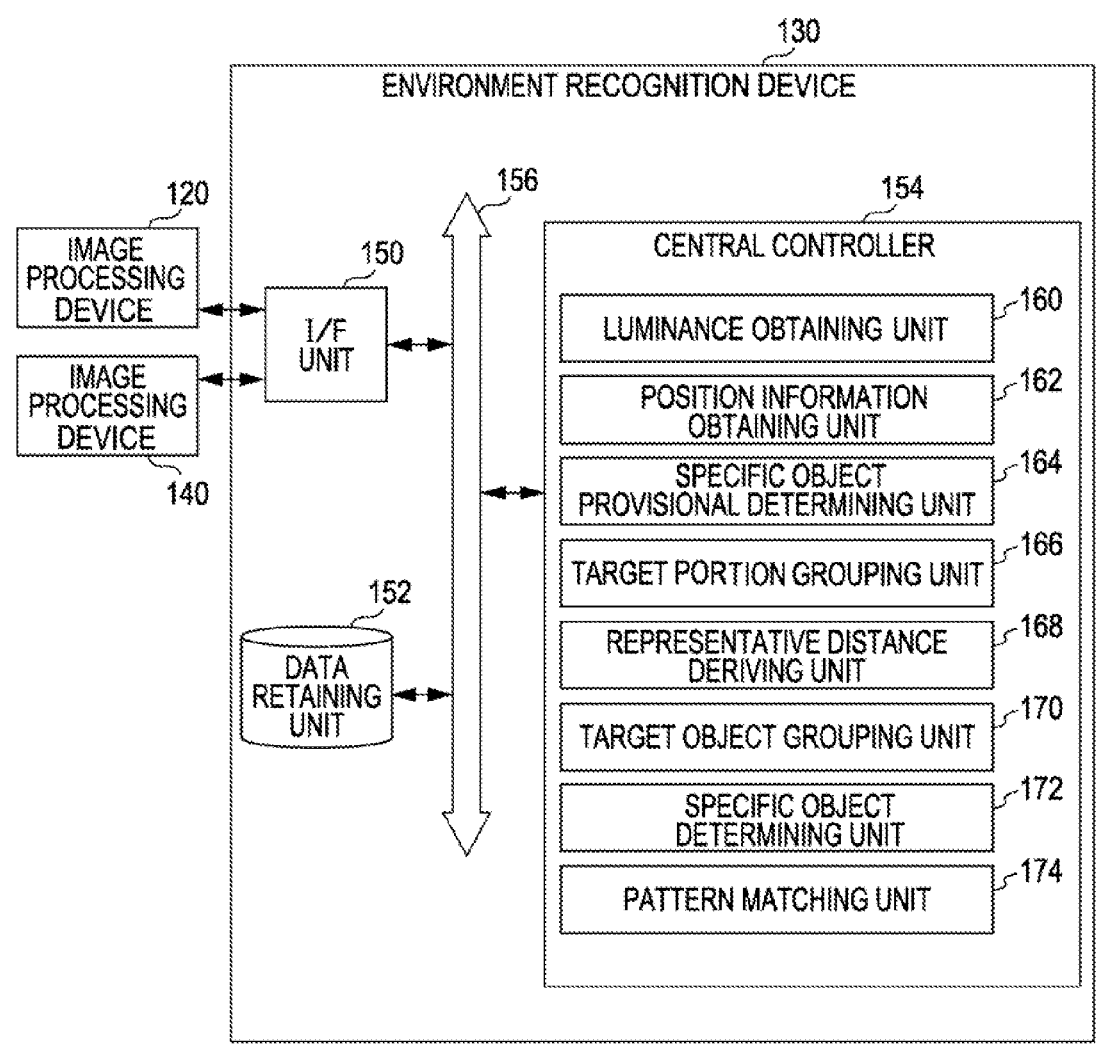
FIG. 3 is a functional block diagram schematically illustrating functions of an environment recognition device.

FIG. 3 is a functional block diagram schematically illustrating functions of an environment recognition device 130. As shown in FIG. 3, the environment recognition device 130 includes an I/F unit 150, a data retaining unit 152, and a central control unit 154.

The I/F unit 150 is an interface for interactive information exchange with the image processing device 120 and the vehicle control device 140. The data retaining unit 152 is constituted by a RAM, a flash memory, an HDD and the like, and retains a specific object table (association) and various kinds of information required for processing performed by each functional unit explained below. In addition, the data retaining unit 152 temporarily retains the luminance image 124 and the distance image 126 received from the image processing device 120. The specific object table is used as follows.

FIG. 4 is an explanatory diagram for explaining a specific object table 200. In the specific object table 200, a plurality of specific objects are associated with a luminance range 202 indicating a range of luminance and a width range 204 indicating a range of size of the specific objects. The specific objects include various objects required to be observed while the vehicle runs on the road, such as "traffic light (red)", "traffic light (yellow)", "traffic light (blue)", "tail lamp (red)", "turn signal (orange)", "road sign (red)", "road sign (blue)", and "road sign (green)". It is to be understood that the specific object is not limited to the objects in FIG. 4. The specific object table 200 defines the order of priority for specifying a specific object, and the environment recognition processing is performed in accordance with the order of priority for each specific object sequentially selected from the plurality of specific objects in the specific object table 200. Among the specific objects, for example, a specific object "traffic light (red)" is associated with luminance (red) "150 or more", luminance (green) "100 or less", luminance (blue) "50 or less", and width range "0.2 to 0.4 m".

In the present embodiment, based on the specific object table 200, a target portion among any target portions in the luminance image 124 is adopted as a candidate for any specific object if the target portion satisfies the condition of a luminance range 202 regarding the specific object. For example, if a luminance of a target portion is included in the luminance range 202 of the specific object "traffic light (red)", the target portion is adopted as a candidate for the specific object "traffic light (red)". Then, when the target object made by grouping the target portions is extracted in a form which appears to be a specific object, for example, when the size of a grouped target object is included in the width range "0.2 to 0.4 m" of the "traffic light (red)", it is determined to be a specific object. The target portion determined to be the specific object is labeled with an identification number unique to the specific object. A pixel or a block made by collecting pixels may be used as the target portion, and in the present embodiment, a pixel are used the target portion for the sake of convenience of explanation.

The central control unit 154 is made of a semiconductor integrated circuit including, for example, a central processing unit (CPU), a ROM storing a program and the like, and a RAM serving as a work area, and controls the I/F unit 150 and the data retaining unit 152 by way of a system bus 156. In the present embodiment, the central control unit 154 also functions as a luminance obtaining unit 160, a position information obtaining unit 162, a specific object provisional determining unit 164, a target portion grouping unit 166, a representative distance deriving unit 168, a target object grouping unit 170, a specific object determining unit 172, and a pattern matching unit 174.

The luminance obtaining unit 160 obtains a luminance by the target portion (pixel) (a luminance consisting of three color phases (red, green, and blue) per pixel) from the received luminance image 124 according to a control instruction of the specific object provisional determining unit 164 explained later. At this time, when it is, for example, rainy or cloudy in the detection area, the luminance obtaining unit 160 may obtain the luminances after adjusting a white balance so as to obtain the original luminances.

The position information obtaining unit 162 uses the stereo method to convert parallax information for each block in the detection area 122 of the distance image 126 into three-dimensional position information including a horizontal distance x in the wide direction, a height y in the height direction from the road surface, and a relative distance z in the depth direction from the subject vehicle 1 according to a control instruction of the representative distance deriving unit 168 explained later. The parallax information represents a parallax of each target portion in the distance image 126, whereas the three-dimensional position information represents information about the relative distance of each target portion in the real world. Accordingly, a term such as the horizontal distance, the height and the relative distance refers to a length in the real world, whereas a term such as a detected distance refers to a distance in the distance image 126. When the parallax information is not derived by the pixel but is derived by the block, that is, in units of a plurality of pixels, a calculation may be executed by the pixel with the parallax information being deemed as parallax information about all the pixels which belong to a block.

Figure 5:
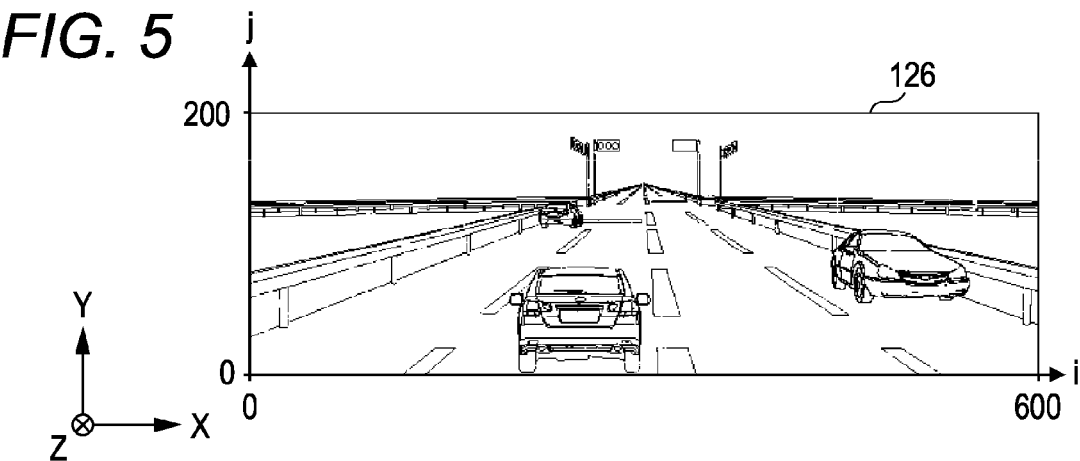
FIG. 5 is an explanatory diagram for explaining conversion into three-dimensional position information performed by a position information obtaining unit.

FIG. 5 is an explanatory diagram for explaining conversion into three-dimensional position information by the position information obtaining unit 162. First, the position information obtaining unit 162 treats the distance image 126 as a coordinate system in units of pixels as shown in FIG. 5. In FIG. 5, the lower left corner is adopted as an origin (0, 0). The horizontal direction is adopted as an i coordinate axis, and the vertical direction is adopted as a j coordinate axis. Therefore, a pixel having a parallax do can be represented as (i, j, dp) using a pixel position i and j and the parallax dp.

The three-dimensional, coordinate system in the real world according to the present embodiment will be considered using a relative coordinate system in which the vehicle 1 is located in the center. The right side of the direction in which the vehicle 1 moves is denoted as a positive direction of X axis, the upper side of the vehicle 1 is denoted as a positive direction of Y axis, the direction in which the vehicle 1 moves (front side) is denoted as a positive direction of Z axis, and the crossing point between the road surface and a vertical line passing through the center of two imaging devices 110 is denoted as an origin (0, 0, 0). When the road is assumed to be a flat plane, the road surface matches the X—Z plane (y=0). The position information obtaining unit 162 uses (formula 1) to (formula 3) shown below to transform the coordinate of the pixel (i, j dp) in the distance image 126 into a three-dimensional point (x, y, z) in the real world.

$$x = CD/2 + z \cdot PW \cdot (i - IV) \quad \text{(formula 1)}$$

$$y = CH + z \cdot PW \cdot (j - JV) \quad \text{(formula 2)}$$

$$z = KS/dp \quad \text{(formula 3)}$$

Here, CD denotes an interval (baseline length) between the imaging devices 110, PW denotes a corresponding distance in the real world to a distance between adjacent pixels in the image, so-called like an angle of view per pixel, CH denotes an disposed height of the imaging device 110 from the road surface, IV and JV denote coordinates (pixel) in the image at an infinity point in front of the vehicle 1, and KS denotes a distance coefficient (KS=CD/PW).

The specific object provisional determining unit 164 provisionally determines a specific object corresponding to the target object using the luminance of the target object on the basis of the specific object table 200 retained in the data retaining unit 152.

More specifically, the specific object provisional determining unit 164 firstly causes the luminance obtaining unit 160 to obtain the luminance of any given target portion in the luminance image 124. Subsequently, the specific object provisional determining unit 164 sequentially selects any specific object from the specific objects registered in the specific object table 200, and determines whether the luminance of the target portion of one obtained target object is included in the luminance range 202 of the specific object sequentially selected. Then, when the luminance is determined to be in the selected luminance range 202, the target portion is provisionally determined to be the specific object, and an identification number representing the specific object is given to the target portion, and a specific object map is generated.

The specific object provisional determining unit 164 sequentially executes a series of comparisons between the luminance of the target portion and the luminance range 202 of the specific objects registered in the specific object table 200. The order selecting the specific objects in the specific object table 200 as explained above also shows the order of priority. That is, in the example of the specific object table 200 of FIG. 4, the comparison processing is executed in the following order: "traffic light (red)", "traffic light (yellow)", "traffic light (blue)", "tail lamp (red)", "turn signal (orange)", "road sign (red)", "road sign (blue)", and "road sign (green)".

When the comparison is made according to the above order of priority, and as a result, the luminance of the target portion is determined to be included in the luminance range 202 of a specific object of a high order of priority, the comparison processing is no longer performed for specific objects of a lower order of priority. Therefore, one target portion is given only at most one identification number representing one specific object. This is because a plurality of specific objects do not overlap in the real world, and thus a target object that is once determined to be any given specific object is no longer determined to be whether or not it is another specific object. By exclusively treating the target portions in this manner, it is possible to avoid redundant specifying processing for the same target portion that is already provisionally determined to be a specific object, and the processing load can be reduced.

Figure 6:
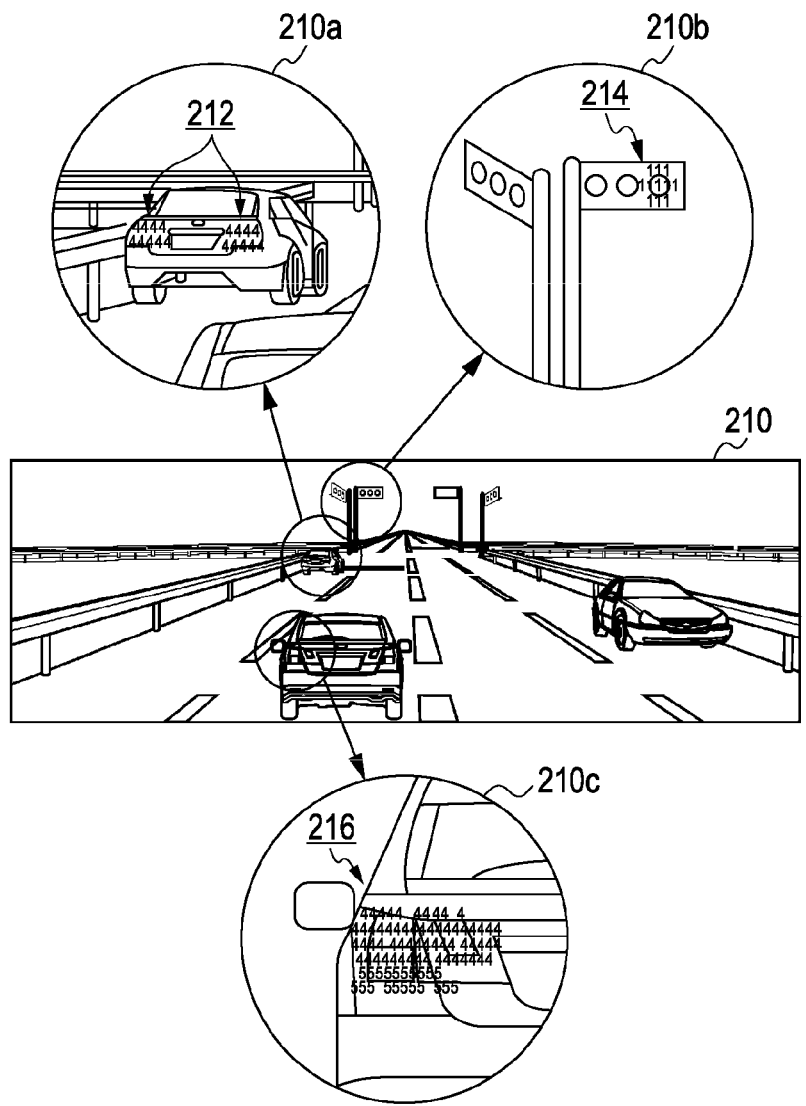
FIG. 6 is an explanatory diagram for explaining a specific object map.

FIG. 6 is an explanatory diagram for explaining a specific object map 210. The specific object map 210 is made by overlaying the identification numbers of the specific objects on the luminance image 124, and the identification number of the specific object is associated with a position corresponding to the target portion provisionally determined to be the specific object.

For example, in a segment map 210a of the specific object map 210, the luminances of target portions 212 corresponding to the tail lamps of the preceding vehicle are compared with the luminance range 202 of the specific objects "traffic light (red)", "traffic light (yellow)", "traffic light (blue)", and "tail lamp (red)" in order. As a result, since the luminances are included in the luminance range 202 of the specific object "tail lamp (red)", an identification number "4" of the specific object "tail lamp (red)" is associated. In a segment map 210b of the specific object map 210, the luminances of target portions 214 corresponding to the light-emitting portions at the right side of the traffic light are included in the luminance range 202 of the specific object "traffic light (red)", and therefore, an identification number "1" of the specific object "traffic light (red)" is associated. Further, in a segment map 210c of the specific object map 220, the luminances of each of target portions 216 corresponding to the back surface lamp portion of the preceding vehicle are compared with the luminance range 202 of each of the specific objects "traffic light (red)", "traffic light (yellow)", and "traffic light (blue)" in order, and finally, an identification number "4" of the specific object "tail lamp (red)" and an identification number "5" of the specific object "turn signal (orange)" are associated. FIG. 6 shows a figure in which identification numbers are given to target portions of the luminance image 124. This is, however, a conceptual representation for the sake of easy understanding. In reality, identification numbers are registered as data at target portions.

The target portion grouping unit 166 adopts any given target portion provisionally determined as a base point, and groups the relevant target portions, which are adjacent in the luminance image 124 and provisionally determined to correspond to a same specific object (attached with a same identification number), into a target object. The target portion grouping unit 166 also adopts the target portion newly added through the grouping processing as a base point, and groups the relevant target portions, which are adjacent and provisionally determined to correspond to a same specific object. Consequently, as long as distances between target portions provisionally determined to be the same specific object are adjacent to each other, all of such target portions are grouped.

Figure 7A:
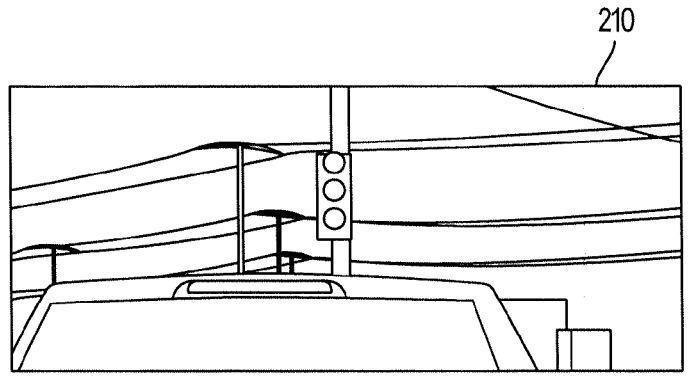
FIGS. 7A to 7D is are explanatory views illustrating processing of a target portion grouping unit.
Figure 7B:
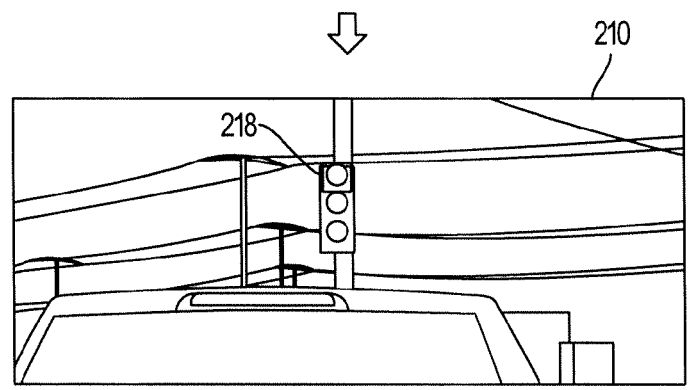

FIGS. 7A to 7D are an explanatory views illustrating processing of the target portion grouping unit 166. In FIG. 7, identification numbers are omitted for the purpose of easy understanding. For example, the target portion grouping unit 166 groups adjacent target portions that are provisionally determined to correspond to the specific object "traffic light (red)" with respect co the identified object map 210 as illustrated in FIG. 7A, and the target portion grouping unit 166 produces a target object 218 as illustrated in FIG. 7B. As a result, the specific object "traffic light (red)" is extracted.

Figure 7C:
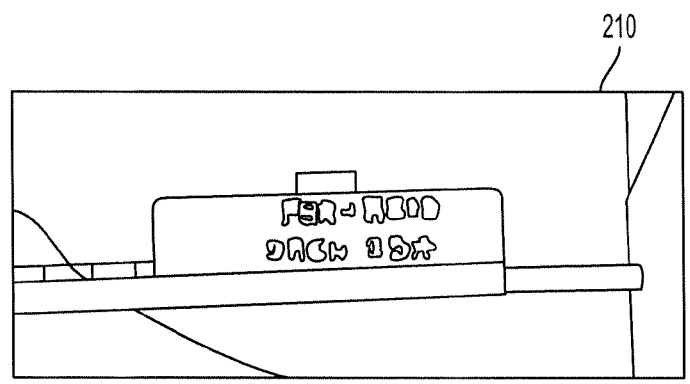
Figure 7D:
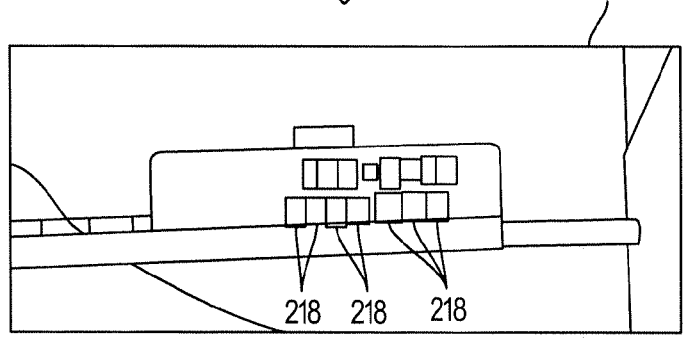

However, when characters with an emitting color of "red" displayed in an light emitting traffic sign are as illustrated in FIG. 7C, the target portion grouping unit 166 groups the target portions in each character to derive target objects 218 as illustrated in FIG. 7D. When a size of the target objects 218 is similar to the specific object "traffic light (red)", each of the characters may be falsely recognized as the specific object "traffic light. (red)". Hereinafter a device, such as the light emitting traffic sign, that provides information accompanied by light, emission is simply referred to as an "indicator".

Here, the traffic light in FIG. 7A and the indicator in FIG. 7C are different as follows: in the traffic light, a light emitting portion does not have a neighboring light emitting portion with a same emission color. In the indicator, on the other hand, a light emitting portion is likely to have a neighboring light emitting portion with a same emission color. Thus, in the embodiment, when a light emitting portion (target object) has a neighboring target portion (or another target object) that is provisionally determined to belong to a same specific object as the light emitting portion, they are further grouped into one target object. As a result, an target object such as the indicator, which displays same light emitting portions with a same color on a same surface can be determined as one target object. The representative distance deriving unit 168 and the target object grouping unit 170, which are used to implement such grouping, will be described below.

The representative distance deriving unit 168 derives a representative distance that is a representative value of a relative distance z of target portions in the target object grouped by the target portion grouping unit 166. The representative distance may be obtained by deriving an average value of the relative distances optionally selected in the grouped target object. In the embodiment, however, a relative distance having a high appearance frequency is used as the representative distance. Specifically, the representative distance deriving unit 168 divides a predetermined distance range into plural divided distance ranges, specifies a divided distance range which includes the relative distance z of each target portion in the target object, and votes to the divided distance range including the relative distance z. When all of the relative distances z of the target portions in the target object, a histogram indicating a distance distribution of the target object is generated. The representative distance deriving unit 168 derives the relative distance corresponding to a peak of the distance distribution (histogram) as the representative distance. As used herein, "corresponding to the peak" means a peak value or a value that satisfies any condition near the peak.

Note that the representative distance may be derived by various procedures other than the above procedure using the peak of the distance distribution. For example, an average value, a maximum value, or a minimum value of the relative distance z of the target portions in the target object. The representative distance needs only to identify one schematic relative distance of the target object.

The target object grouping unit 170 determines whether or not a luminance of a target portion, between which and the target object differences in the horizontal and the vertical direction fall within a first predetermined range respectively and between whose relative distance and the representative distance of the target object a difference falls within a second predetermined range, corresponds to the luminance of the given target object. The first predetermined range and the second predetermined range may be set to, for example, 1.0 m in the real world. When there is a target portion corresponding to the same specific object as the target object, the target object grouping unit 170 also groups the target portion into the target object. In the real world, even when target portions are close to each other in the width direction x and in the height direction y, the relative distance in the depth direction z thereof may be greatly different. In such case, the target portions belong to different target objects. Therefore, when a target portion is far from any other target objects with respect to the width x, the height y, or the depth z, the group including the target portion may be deemed as an independent target object. In so doing, it is possible to perform highly accurate grouping processing.

In the above processing, the target object grouping unit 170 groups plural target portions into a target object only when the plural target portions within the first predetermined range and the second predetermined range are adjacent to each other, and the number of target portions is equal to or more than a predetermined number (for example, 5). For example, when the plural target portions within the first predetermined range and the second predetermined range are adjacent to each other, and there are a reasonable number of such target portions, the group of the target portions may be regarded as a part of the target object already given. In so doing, it is possible to exclude a target portion that is generated as a noise and corresponds to the same specific object as the given target object, whereby the grouping can properly be performed.

The target object grouping unit 170 regards a relative distance z of a target portion grouped into the given target object as the representative distance, and further groups another target portion satisfying the condition into the given target object with the grouped target portion as the base point.

Figure 8A:
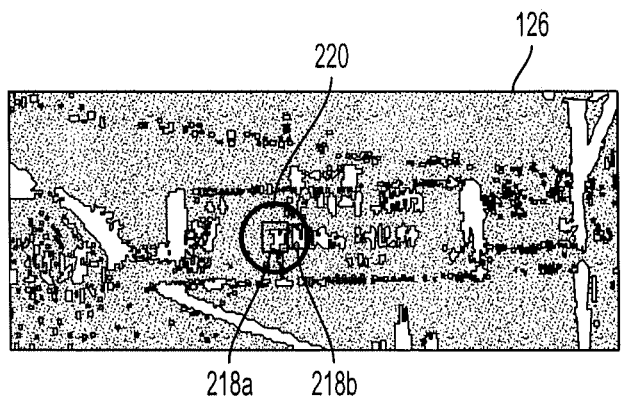
FIGS. 8A to 8C are explanatory views illustrating processing of a target object grouping unit.
Figure 8B:
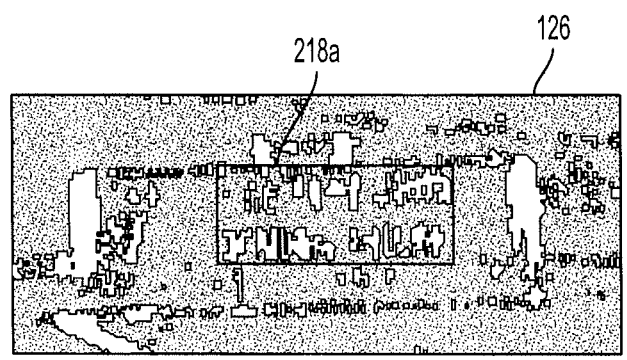
Figure 8C:
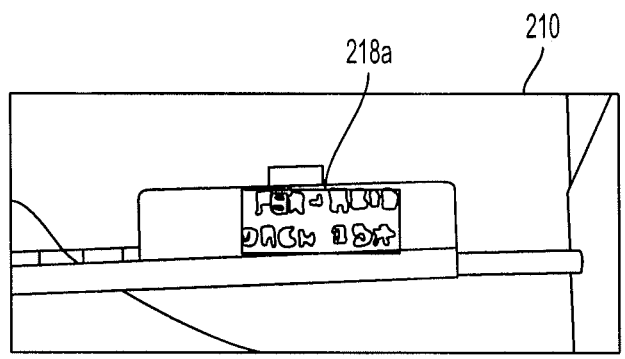

FIGS. 8A to 8C are explanatory views illustrating processing of the target object grouping unit 170. FIGS. 8A and 8B illustrate a distance image 126 corresponding to the specific object map 210 in FIG. 7D, and FIG. 8C illustrates the specific object map 210 with respect to the same object as FIG. 7D. As illustrated in FIG. 8A, with the target object 218a as the base point, the target object grouping unit 170 searches for a target portion, which is within a first predetermined range 220 based on the center (barycenter) position of the target object 218a and the second predetermined range and corresponds to a same specific object as the target object 218a. In the drawing, a target object 218b corresponds to a same specific object as a target object 218a, and the number of adjacent target portions is equal to or more than the predetermined number. Therefore, the target object 218b is grouped into the target object 218a.

Then the target object grouping unit 170 regards a relative distance z of the target portion (target object 218b) already grouped into the target object 218a as the representative distance, and further groups another target portion satisfying the condition into the target object 218a with the grouped target portion as the base point. The condition is that the target portion falls within the first predetermined range and the second predetermined range and corresponds to the same specific object as the target object 218a Thus, target objects (target portions) which are close to each other can be collected into one target object 218a as illustrated in FIG. 8B by sequentially grouping the target portions determined to correspond to a same specific object. Unlike the case in which a wide range is grouped at once, target portions are sequentially grouped, whereby only a target object having high continuity can properly be grouped. In FIG. 8C, the one target object 218a is incorporated into the specific object map 210. Although provisionally determined to be the specific object. "traffic light (red)" with respect to the luminance, the target object 218a is not finally determined to be the specific object. "traffic light (red)" because the size of the target object 218a is not less than 0.4 m (see FIG. 4). In this manner, it is possible to avoid the indicator from erroneously being determined to be traffic light.

In this case, the target object grouping unit 170 makes the determination using the horizontal distance and the height in the real world, but when a determination is made using the detection distances in the luminance image 124 and the distance image 126, the threshold value of the first predetermined range for grouping is changed according to the relative distance of the target portion. As shown in FIG. 2 and the like, distant objects and close objects are represented in the flat plane in the luminance image 124 and the distance image 126, and therefore, an object located at a distant position is represented in a small (short) size and an object located at a close position is represented in a large (long) size. Therefore, for example, the threshold value of the predetermined range in the luminance image 124 and the distance image 126 is set at a small value for a distant target portion, and set at a large value for a close target portion. Therefore, even when the detection distances are different between a distant position and a close position, the grouping processing can be stably performed. In the case in which the determination is made based on the detection distance on the distance image 126, the first predetermined range may be defined by the number of pixels. For example, (adjacent) pixels having a gap of one pixel therebetween in the horizontal direction or the vertical direction may be grouped.

In the above description, each of the difference in the width direction x, the difference in the height direction y, and the difference in the depth direction z is independently determined, and only when all of them are included within the predetermined range, the target portion is grouped into a same group. However, grouping processing may be performed using another calculation. For example, when Euclidean distance, square root of ((difference in the wide direction x)$^2$+ (difference in the height direction y)$^2$+(difference in the depth direction z)$^2$) is included within a third predetermined range, target portions may be grouped into a same group. With such calculation, the distance between the target object and another target portion in the real world can be derived accurately, and therefore, grouping accuracy can be enhanced.

When a target object made as a result of grouping processing by the target object grouping unit 170 satisfies a predetermined condition, the specific object determining unit 172 determines that the target object is a specific object. For example, as shown in FIG. 4, when the width range 204 is associated with the specific object table 200, and the size of a target object (both the width direction x and the height direction y) is included in the width range 204 of a specific object provisionally determined, the specific object determining unit 174 determines the target object as the specific object. A separate width range 201 may be set for each of the width direction x and the height direction y. Here, it is examined whether the target object is of a size adequate to be deemed as a specific object. Therefore, when the size of the target object is not included in the width range 204, the target object can be excluded as information unnecessary for the environment recognition processing. For example, in the examples of FIGS. 7 and 8, the size of the target object 218 in FIG. 7B is included in the width range of "0.2 m to 0.4 m" of the specific object "traffic light (red)", and thus the target object 218 is properly specified as the specific object "traffic light (red)". On the other hand, the size of the target object 218a in FIG. 8C is not included in the width range of "0.2 m to 0.4 m" of the specific object "traffic light (red)", the target object 218a is not specified as the specific object "traffic light (red)".

As a result, the environment recognition device 130 can extract, from the luminance image 124, one or more target objects as specific objects, and the information can be used for various kinds of control. For example, when the specific object "traffic light (red)" is extracted, this indicates that the target object is a fixed object that does not move, and when the target object is a traffic light for the lane of the subject vehicle 1, this indicates that the subject vehicle 1 has to stop or decelerate. When the specific object "tail lamp (red)" is extracted, this indicates that there is a preceding vehicle travelling together with the subject vehicle 1 and that the back surface of the preceding vehicle is at the relative distance of the specific object "tail lamp (red)".

When a specific object determined by the specific object determining unit 172 is, for example, a "sign" and it is assumed that the specific object indicates a speed limit, the pattern matching unit 174 further executes pattern matching for a numerical value indicated therein, and specifies the numerical value. In this manner, the environment recognition device 130 can recognize the speed limit and the like of the traffic lane in which the subject vehicle is travelling.

In the present embodiment, the specific object determining unit 172 first extracts a plurality of limited specific objects, and then only has to performs the pattern matching only on the extracted specific objects. Therefore, in contrast to the conventional case where pattern matching is performed on the entire surface of the luminance image 124, the processing load is significantly reduced.

(Environment Recognition Method)

Figure 9:
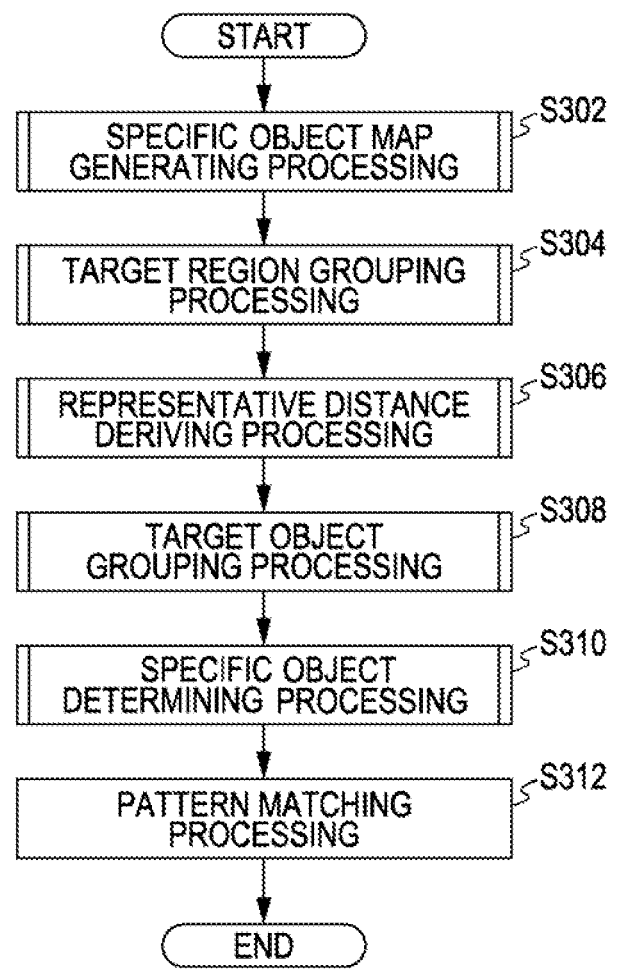
FIG. 9 is a flowchart illustrating an overall flow of an environment recognition method.

Hereinafter, specific processing performed by the environment recognition device 130 will be explained based on the flowchart shown in FIGS. 9 to 14. FIG. 9 illustrates an overall flow of interrupt processing when the image processing device 120 transmits the distance image (parallax information) 126. FIGS. 10 to 14 illustrate subroutines therein. In this description, a pixel is used as target portion, and the lower left corners of the luminance image 124 and the distance image 126 are origins. The processing is performed according to the environment recognition method in a range of 1 to 600 pixels in the horizontal direction of the image and 1 to 200 pixels in the vertical direction of the image. In this description, the number of specific objects to be checked is assumed to be eight.

As shown in FIG. 9, when an interrupt occurs according to the environment recognition method in response to reception of the distance image 126, the luminance image 124 obtained from the image processing device 120 is referred to, and a specific object map 210 is generated (S302).

Subsequently, a target object provisionally determined is made into a group (S304), the representative distance of the grouped target object is derived (S306), a target portion near the target object is further incorporated into the grouped target object by grouping (S308), and the grouped target object is determined as a specific object (S310). If it is necessary to further obtain information from the specific object thus determined, the pattern matching unit 174 executes the pattern matching on the specific object (S312). Hereinafter, the above processing will be explained more specifically.

(Specific Object Map Generating Processing S302)

Figure 10:
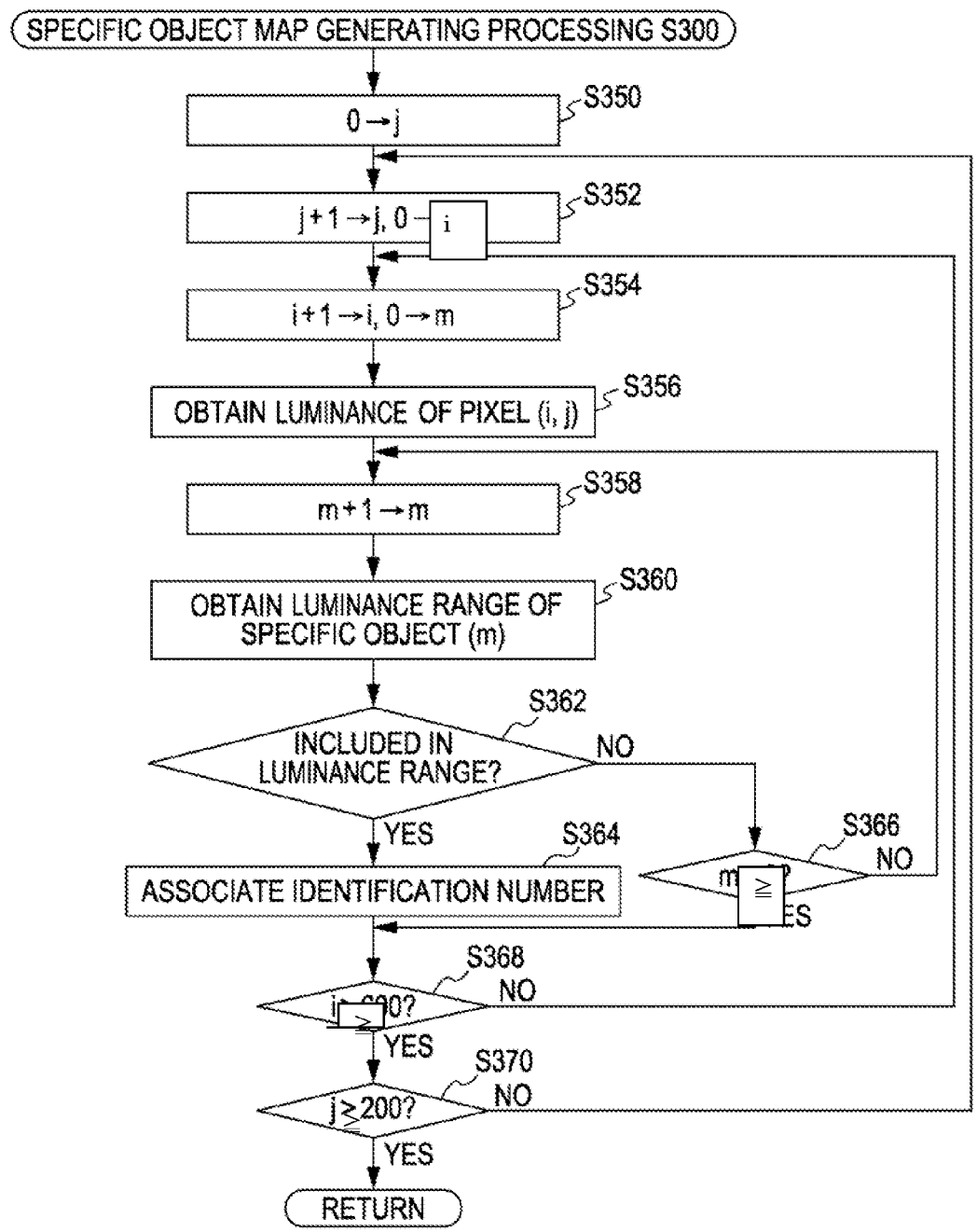
FIG. 10 is a flowchart illustrating a flow of specific object map generating processing.

As shown in FIG. 10, the specific object provisional determining unit 164 initializes (substitutes "0" to) a vertical variable j for specifying a target portion (pixel) (S350). Subsequently, the specific object provisional determining unit 164 adds "1" to (increments by 1) the vertical variable j, and initializes (substitutes "0" to) a horizontal variable i (S352). Then, the specific object provisional determining unit 164 adds "1" tactic horizontal variable i, and initializes (substitutes "0" to) a specific object variable m (S354). Here, the horizontal variable i and the vertical variable j are provided to execute the specific object map generating processing on all of the 600×200 pixels, and the specific object variable m is provided to sequentially compare eight specific objects for each pixel.

The specific object provisional determining unit 161 causes the luminance obtaining unit 160 to obtain a luminance of a pixel (i, j) as a target portion from the luminance image 124 (S356), adds "1" to the specific object variable m (S358), obtains the luminance range 202 of the specific object (m) (S360), and determines whether or not the luminance of the pixel (i, j) are included in the luminance range 202 of the specific object (m) (S362).

When the luminance of the pixel (i, j) is included in the luminance range 202 of the specific object (m) (YES in S362), the specific object provisional determining unit 164 associates an identification number p representing the specific object (m) with the pixel, so as to be expressed as a pixel (i, j, p) (S364). In this manner, the specific object map 210 is generated, in which a identification number is given to each pixel in the luminance image 124. When the luminance of the pixel (i, j) is not included in the luminance range 202 of the specific object (m) (NO in S362), a determination is made as to whether or not the specific object variable m is equal to or more than 8 which is the maximum number of specific objects (S366). When the specific object variable m is less than the maximum value (NO in S366), the processings are repeated from the increment processing of the specific object variable m in step S358. When the specific object variable m is equal to or more than the maximum value (YES in S366), which means that there is no specific object corresponding so the pixel (i, j), the processing in step S368 subsequent thereto is performed.

Then, the specific object provisional determining unit 164 determines whether or not the horizontal variable i is equal to or more than 600 which is the maximum value of horizontal pixel (S368), and when the horizontal variable i is less than the maximum value (NO in S368), the processings are repeated from the increment processing of the horizontal variable i in step S354. When the horizontal variable i is equal to or more than the maximum value (YES in S368), the specific object provisional determining unit 164 determines whether or not the vertical variable j is equal to or more than 200 which is the maximum value of vertical pixel (S370). Then, when the vertical variable 1 is less than the maximum value (NO in S370), the processings are repeated from the increment processing of the vertical variable 1 in step S352. When the vertical variable j is equal to or more than the maximum value (YES in S370), the specific object map generating processing is terminated.

(Target Portion Grouping Processing S304)

Figure 11:
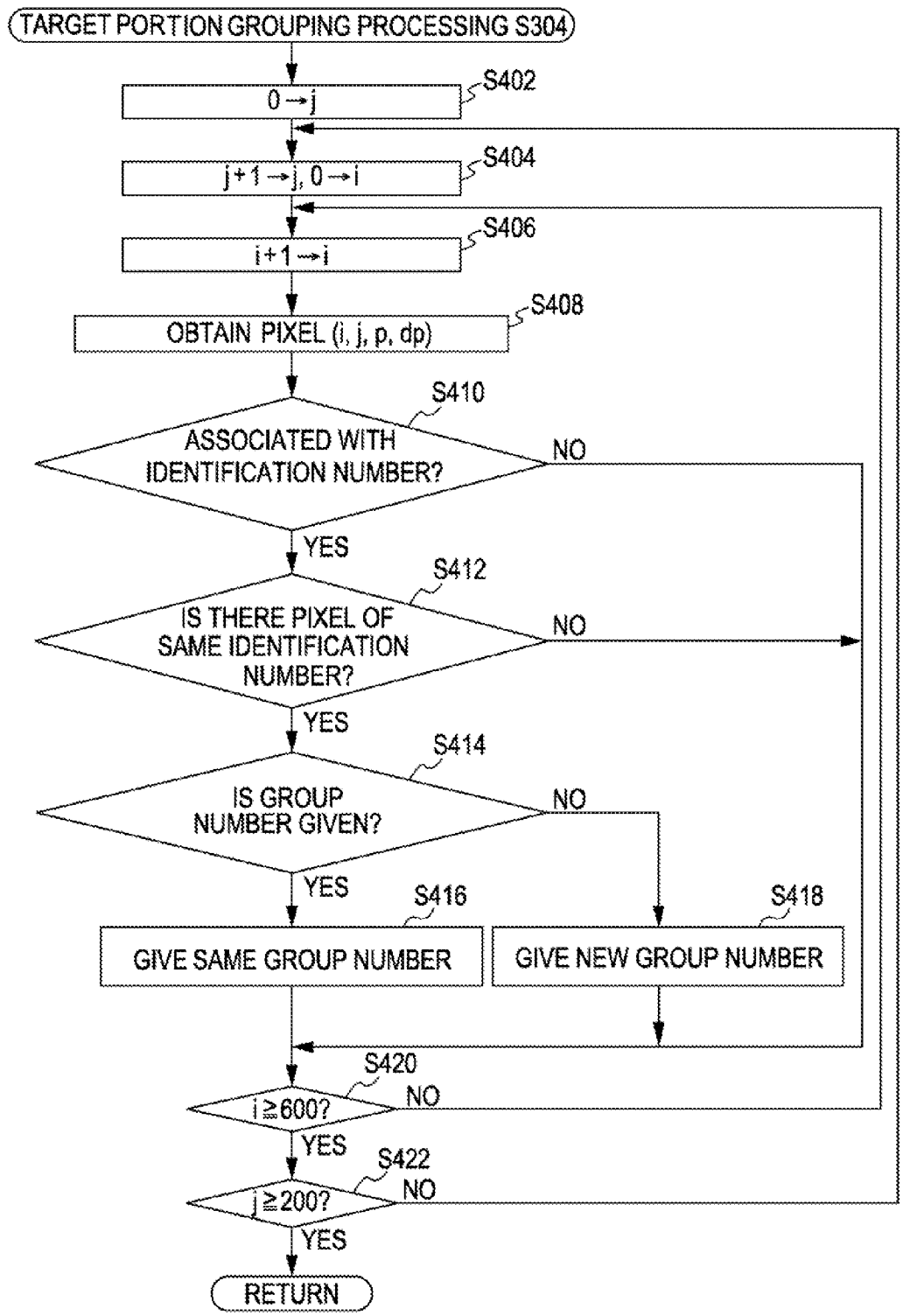
FIG. 11 is a flowchart illustrating a flow of target portion grouping processing.

As shown in FIG. 11, the target portion grouping unit 166 initializes (substitutes "0" to) a vertical variable j for specifying a target portion (pixel) (S402). Subsequently, the target portion grouping unit 166 adds "1" to the vertical variable j, and initializes (substitutes "0" no) a horizontal variable i (S404). Then, the target portion grouping unit 166 adds "1" to the horizontal variable i (S406).

The target portion grouping unit 166 obtains a pixel (i, j, p, dp) as the target portion from the luminance image 124 (S408). Then, a determination is made as to whether an identification number p of a specific object is associated with the pixel (i, j, p, dp) (S460). When the identification number p is associated (YES in S410), the target portion grouping unit 166 determines whether or not there is another pixel that is adjacent to the pixel (i, j, p, dp) and associated with the same identification number p (S412).

When there is another pixel (i, p, dp) associated with the same identification number (YES in S412), the target portion grouping unit 166 determines whether or not a group number g is given to any of all the pixels in the predetermined range including the pixel under determination (S414). When the group number g is given to any of them (YES in S414), the target portion grouping unit 166 gives a value to all of the pixels included in the predetermined range and all of the pixels to which the same group number g is given, the value being a smaller one of the smallest group number g among the group numbers given thereto or the smallest value of numbers that have not yet used as a group number, so as to expressed as a pixel (i, j, p, dp, g) (S416). When the group number p is given to none of them (NO in S414), the smallest value of numbers that have not yet used as a group number is newly given to all the pixels in the predetermined range including the pixel under determination (S418).

In this manner, when there is a plurality of target portions that have a same identification number in the adjacent pixels, grouping process is performed by giving one group number g. If a group number g is given to none of the plurality of target portions, a new group number g is given, and if a group number g is already given to any one of them, the same group number g is given to the other target portions. However, when there is a plurality of group numbers g in the plurality of target portions, the group numbers g of all the target portions are replaced with one group number g so as to treat the target portions as one group.

In the above description, the group numbers g of not only all the adjacent pixels but also all the pixels to which the same group number g is given are changed at a time. The primary reason for this is to avoid dividing the group already unified by changing of the group numbers g. In addition, a smaller one of the smallest group number g or the smallest value of numbers that have not yet used as a group number is employed in order to avoid making a skipped number as much as possible upon group numbering. In so doing, the maximum value of the group number g does not become unnecessarily large, and the processing load can be reduced.

When an identification number p is not associated (NO in S410), or when there is no other pixel that has the identification number p (NO in S412), the processing in step S420 subsequent thereto is performed.

Subsequently, the target portion grouping unit 166 determines whether or not the horizontal variable i is equal to or more than 600 which is the maximum value of horizontal pixel (S420). When the horizontal variable i is less than the maximum value (NO in S420), the processings are repeated from the increment processing of the horizontal variable i in step S406. When the horizontal variable i is equal to or more than the maximum value (YES in S420), the target portion grouping unit 166 determines whether or not the vertical variable j is equal to or more than 200 which is the maximum value of vertical pixel (S422). When the vertical variable j is less than the maximum value (NO in S472), the processings are repeated from the increment processing of the vertical variable j in step S404. When the vertical variable j is equal to or more than the maximum value (YES in S422), the target portion grouping processing is terminated.

(Representative Distance Deriving Processing S306)

Figure 12:
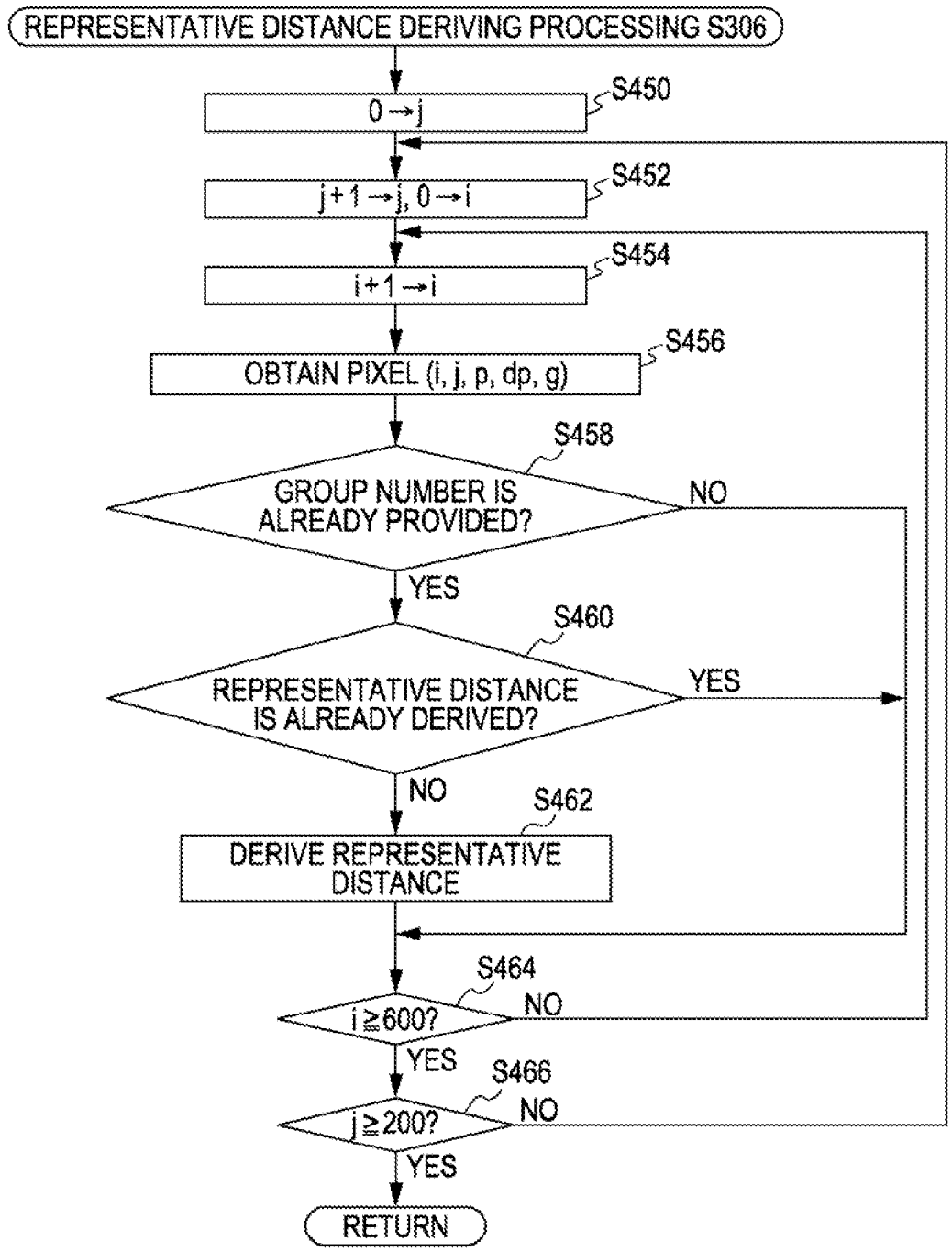
FIG. 12 is a flowchart illustrating a flow of representative distance deriving processing.

As shown in FIG. 12, the representative distance deriving unit 168 initializes (substitutes "0" to) a vertical variable j for specifying a target portion (pixel) (S450). Subsequently, the representative distance deriving unit 168 adds "1" to the vertical variable j, and initializes (substitutes "0" to) a horizontal variable i (S452). Then, the representative distance deriving unit 168 adds "1" to the horizontal variable i (S454).

The representative distance deriving unit 168 obtains a pixel (i, j, p, dp, g) as the target portion from the luminance image 124, transforms the coordinate of the pixel (i, j, p, dp, g) including the parallax information dp into a point (x, y, z) in the real world so as to expressed as a pixel (i, j, p, dp, g, x, y, z) (S456). Then the representative distance deriving unit 168 determines whether or not the group number g of the pixel (i, j, p, dp, g, x, y, z) is a valid value, that is, whether or not the group number g is already provided (S458). When a valid value is provided as the group number g (YES in 458), the representative distance deriving unit 168 determines whether or not the representative distance of a target object including the pixel (i, j, p, dp, g, x, y, z) is already derived (S460).

When the representative distance of the target object including the pixel is not derived yet (NO in S460), the representative distance deriving unit 168 derives the representative distance, sets a representative distance rd to all the target portions in the target object so as to expressed as a pixel (i, j, p, dp, g, x, y, z, rd) (S462). The representative distance is a relative distance z that corresponds to a peak of the relative distance distribution of the target portions in the target object. When the group number g is the invalid value (NO in S458), or when the representative distance is already derived (YES in S460), the processing in step S464 subsequent thereto is performed.

Subsequently, the representative distance deriving unit 168 determines whether or not the horizontal variable i is equal to or more than 600 which is the maximum value of horizontal pixel (S464), and when the horizontal variable i is less than the maximum value (NO in S464), the processings are repeated from the increment processing of the horizontal variable i in step S454. When the horizontal variable i is equal to or more than the maximum value (YES in S464), the representative distance deriving unit 168 determines whether the vertical variable j is equal to or more than 200 which is the maximum value of vertical pixel (S466). Then, when the vertical variable j is less than the maximum value (NO in S466), the processings are repeated from the increment processing of the vertical variable j in step S402. When the vertical variable j is equal to or more than the maximum value (YES in S466), the representative distance deriving processing is terminated.

(Target Object Grouping Processing S308)

Figure 13:
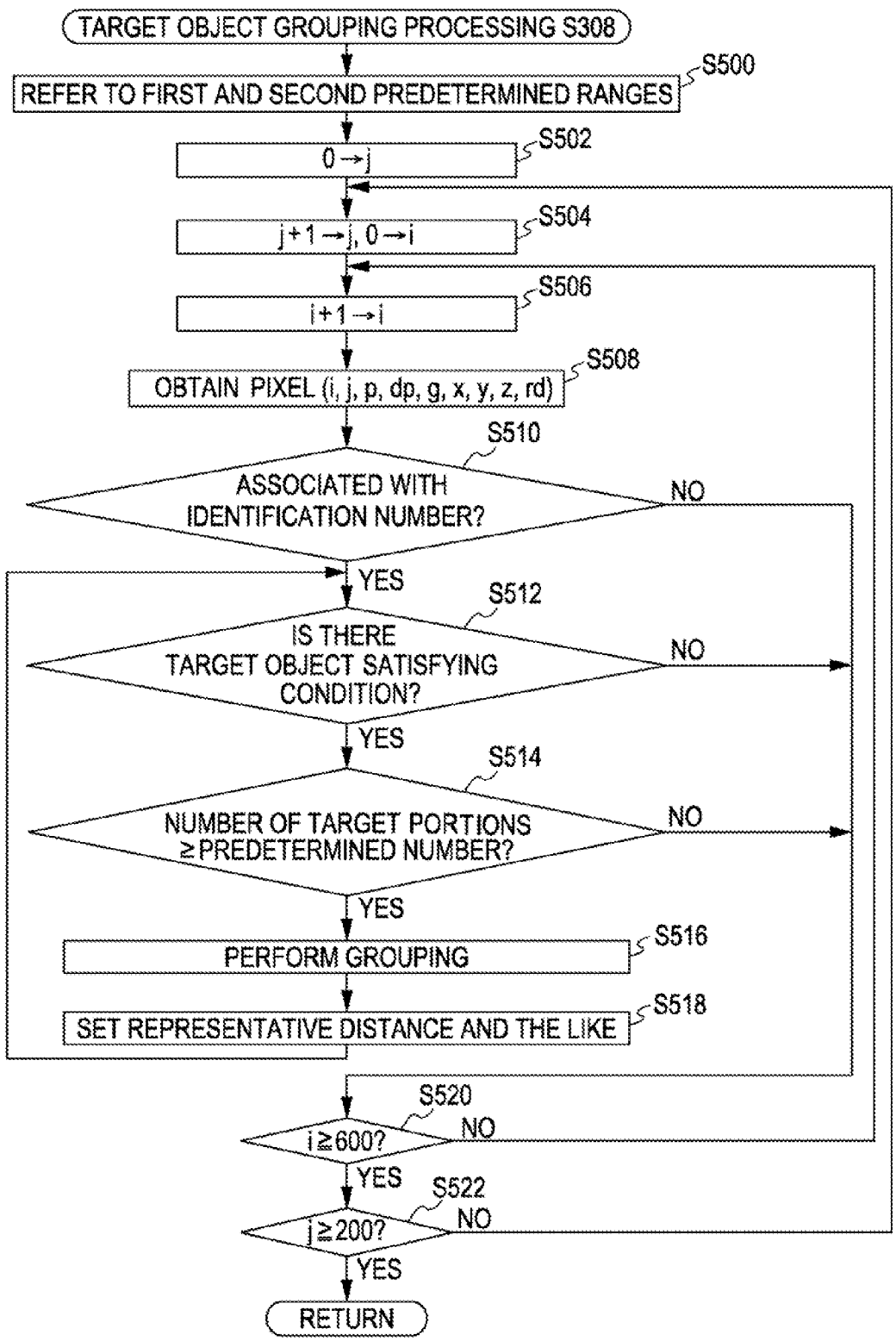
FIG. 13 is a flowchart illustrating a flow of target object grouping processing.

As shown in FIG. 13, the target object grouping unit 170 refers to the first and second predetermined ranges to group target portions (S500), and initializes (substitutes "0" to) the vertical variable j for specifying a target portion (pixel) (S502). Subsequently, the grouping unit 166 adds "1" to the vertical variable j, and initializes (substitutes "0" to) the horizontal variable i (S504). Then, the grouping unit 166 adds "1" to the horizontal variable i (S506).

The target object grouping unit 170 obtains a pixel (i, j, p, dp, g, x, y, z, rd) as the target portion from the luminance image 124 (S508). Then, a determination is made as to whether an identification number p of the specific object is associated with the pixel (i, j, p, dp, g, x, y, z, rd) (S510). When the identification number p is associated (YES in S510), the target object grouping unit 170 determines whether or not there is another pixel associated with the same identification number p in the first and second predetermined ranges (S512).

When there is another pixel associated with the same identification number p (YES in S512), the target object grouping unit 170 determines whether or not the number of target portions in the target object including the another pixel is equal to or more than a predetermined number (S514). When the number of target portions in the target object is equal to or more than the predetermined number (YES in S514), the target object grouping unit 170 groups the target object including the another pixel together with the target object including the pixel (i, j, p, dp, g, x, y, z, rd), and substitutes the group number of the target object including the another pixel for the group number of the target object including the pixel (i, j, p, dp, g, x, y, z, rd) (S516). The target object grouping unit 170 derives the representative distance of the grouped target object, and repeats the processings from the condition of step S512 (S518). In so doing, a neighboring target object is searched with respect to not only the target object serving as the base point but also the grouped target object.

When an identification number p is not associated (NO in S510), when there is no target object satisfying the condition (NO in S512), or when the number of target portions is less than the predetermined number (NO in S514), the processing in step S520 subsequent thereto is performed.

Subsequently, the target object grouping unit 170 determines whether or not the horizontal variable i is equal to or more than 600 which is the maximum value of horizontal pixel (S520). When the horizontal variable i is less than the maximum value (NO in S520), the processings are repeated from the increment processing of the horizontal variable i in step S506. When the horizontal variable i is equal to or more than the maximum value (YES in S520), the grouping unit 166 determines whether or not the vertical variable j is equal to or more than 200 which is the maximum value of vertical pixel (S522). When the vertical variable j is less than the maximum value (NO in S522), the processings are repeated from the increment processing of the vertical variable j in step S504. When the vertical variable j is equal to or more than the maximum value (YES in S522), the target object grouping processing is terminated.

(Specific Object Determination Processing S310)

Figure 14:
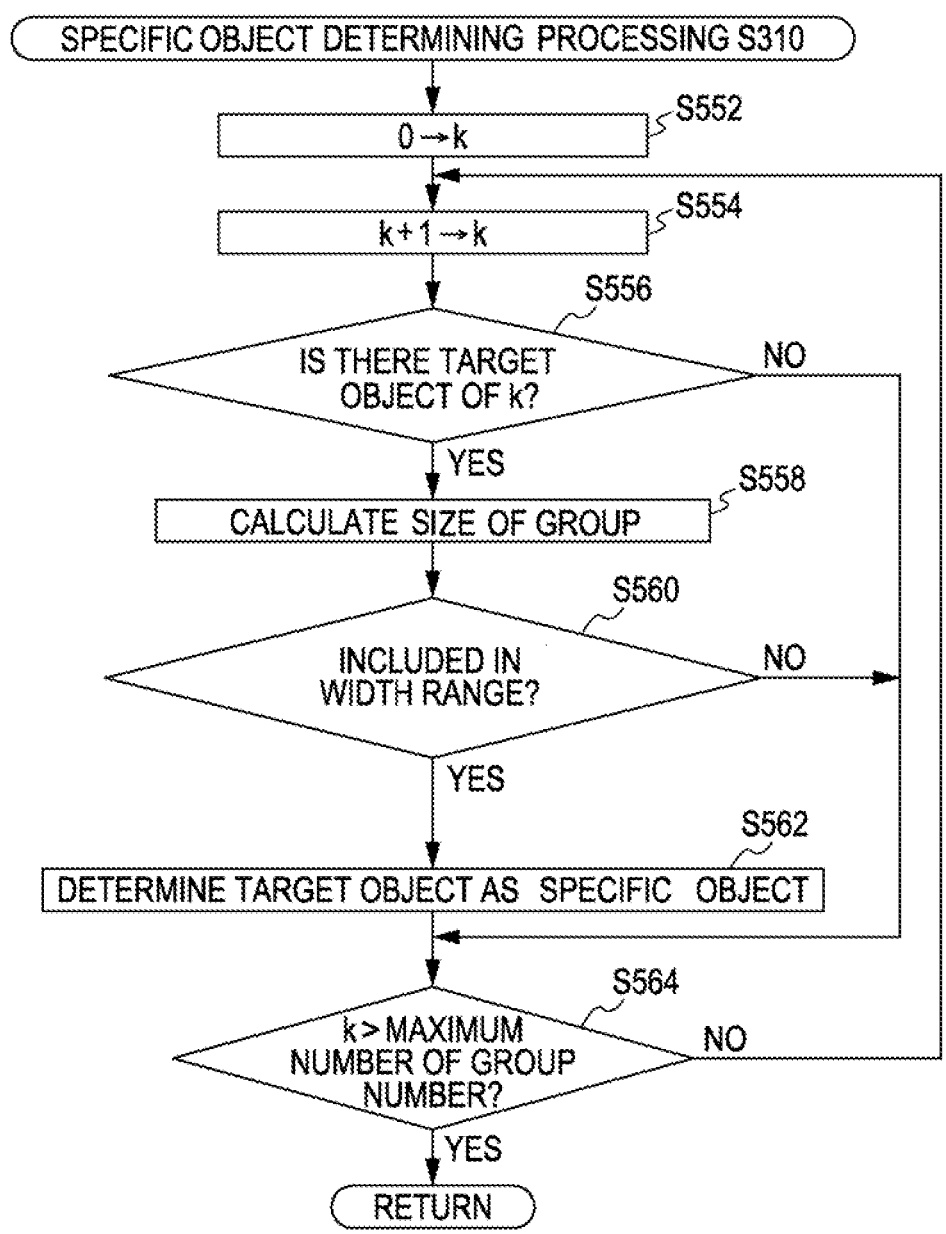
FIG. 14 is a flowchart illustrating a flow of specific object determining processing.

As shown in FIG. 14, the specific object determining unit 172 initializes (substitutes "0" to) a group variable k for specifying a group (S552). Subsequently, the specific object determining unit 172 adds "1" to the group variable k (S554).

The specific object determining unit 172 determines whether or not there is a target object of which group number g is the group variable k from the luminance image 124 (S556). When there is such target object (YES in S556), the specific object determining unit 172 calculates the size of the target object to which the group number g is given (S558). The size of the target object is specified by a horizontal direction component that is a horizontal distance (difference) between the pixel located at the left end and the pixel located at the right end and a vertical direction component that is a height (difference) between the pixel located at the upper end and the pixel located at the lower end. The specific object determination unit 172 determines whether or not the calculated size is included in the width range 204 of the specific object indicated by the identification number p associated with the target object having the group number g which is the group variable k (S560). For example, when the horizontal direction component of the size of the target object falls within the width range 204 of the specific object "traffic light (red)", and when the vertical direction component of the size of the target object falls within the width range 204 of the specific object "traffic light (red)", the specific object determination unit 172 can determine that the target object is included in the width range 204 of the identified object "traffic light (red)".

When the size is included in the width range 204 of the specific object represented by the identification number p (YES in S560), the specific object determining unit 172 determines that the target object is the specific object (S562). When the size is not included in the width range 204 of the specific object represented by the identification number p (NO in S560), or, when there is no target object of which group number g is the group variable k (NO in S556), the processing in step S564 subsequent subsequent thereto is performed.

Subsequently, the specific object determining unit 172 determines whether or not the group variable k is equal to or more than the maximum value of group number set in the grouping processing (S564). Then, when the group variable k is less than the maximum value (NO in S564), the processings are repeated from the increment processing of the group variable k in step S554. When the group variable k is equal to or more than the maximum value (YES in S564), the specific object determining processing is terminated. As a result, the grouped target objects are formally determined to be the specific object.

As described above, the environment recognition device 130 specifies a target object that should be recognized as one target object can be grouped based on the horizontal distance x, the height y, and the relative distance z, and thus the accuracy of specifying the target object can be improved, whereby false recognition can be avoided.

Before the grouping is performed based on the horizontal distance x, the height y, and the relative distance z, adjacent pixels having a same identification number p are grouped without utilizing the distance information, and the target object is spread with the grouped target object as the base point. Therefore, the equal result can be obtained by the significantly light processing load compared with the case in which the grouping is performed to all target portions from the beginning based on the horizontal distance x, the height y, and the relative distance z.

In addition, a program for allowing a computer co function as the environment recognition device 130 is also provided as well as a storage medium such as a computer-readable flexible disk, a magneto-optical disk, a ROM, a CD, a DVD, a BD storing the program. Here, the program means a data processing function described in any language or description method.

While a preferred embodiment of the present invention has been described hereinabove with reference to the appended drawings, it is to be understood that the present invention is not limited to such embodiment. It will be apparent to those skilled in the art that various changes may be made without departing from the scope of the invention.

For example, in the present embodiment, the three-dimensional position of the target object is derived based on the parallax between image data using the plurality of imaging devices 110. However, the present invention is not limited to such case. Alternatively, for example, a variety of known distance measuring devices such as a laser radar distance measuring device may be used. In this case, the laser radar distance measuring device emits laser beam to the detection area 122, receives light reflected when the laser beam is irradiated the object, and measures the distance to the object based on the time required for this event.

In the present embodiment, it is assumed that the imaging device 110 obtains a color image. However, the present invention is not limited to such case. Alternatively, a monochrome image may be obtained. In this case, the specific object table 200 is defined by a single-color luminance.

The above embodiment describes an example in which the position information obtaining unit 162 receives the distance image (parallax information) 126 from the image processing device 120, and generates the three-dimensional position information. However, the present invention is not limited to such case. The image processing device 120 may generate the three-dimensional position information in advance, and the position information obtaining unit 162 may obtain the generated three-dimensional position information. Such a functional distribution can reduce the processing load of the environment recognition device 130.

In the above embodiment, the luminance obtaining unit 160, the position information obtaining unit 162, the specific object provisional determining unit 164, the target portion grouping unit 166, the representative distance deriving unit 168, the specific object determining unit 172, and the pattern matching unit 174 are configured to be operated by the central control unit 154 with software. However, the functional units may be configured with hardware.

The specific object determining unit 172 determines a specific object by, for example, whether or not the size of the target object is included in the width range 204 of the specific object. However, the present invention is not limited to such case. The specific object determining unit 172 may determine a specific object when various other conditions are also satisfied. For example, a specific object may be determined when a ratio that is a difference in the depth direction z to a difference in the wide direction x or a difference in the depth direction z to a difference in the height direction y is substantially constant (continuous) in a target object or when the relative movement speed with respect to the depth direction z is constant. Such a ratio may be specified by linear approximation by the Hough transform or the least squares method.

The steps of the environment recognition method in this specification do not necessarily need to be processed chronologically according to the order described in the flowchart. The steps may be processed in parallel, or may include processings using subroutines.

The present invention can be used for an environment recognition device and an environment recognition method for recognizing a target object based on the luminance of the target object in a detection area.

The invention claimed is:

1. An environment recognition device comprising:
    a data retaining unit that retains ranges of luminance values in association with specific objects;
    a luminance obtaining unit that obtains luminance values of target portions in a detection area;
    a specific object provisional determining unit that provisionally determines a specific object corresponding to each of the target portions from the luminance values on the basis of the association retained in the data retaining unit;
    a target portion grouping unit that groups, as a target object, adjacent target portions provisionally determined to correspond to a same specific object;
    a position information obtaining unit that obtains a relative distance of each of the target portions from a vehicle on which the environment recognition device is mounted;
    a representative distance deriving unit that derives a representative distance that is a representative value of relative distances of target portions grouped into the target object; and
    a target object grouping unit that groups another target portion into the target object, when differences in a horizontal direction and a vertical direction between the another target portion and the target object fall within a first predetermined range and a difference between a relative distance of the another target portion from the vehicle and the representative distance of the target object falls within a second predetermined range, and when a luminance value of the another target portion corresponds to a luminance value of the target object.

2. The environment recognition device according to claim 1, wherein the target object grouping unit groups a plurality of target portions into the target object, when the plurality of target portions in the first predetermined range and the second predetermined range are adjacent to each other, and when a number of target portions is not less than a predetermined number.

3. The environment recognition device according to claim 1, wherein the target object grouping unit regards the relative distance of the target portion which is grouped as a representative distance, and further groups another target portion satisfying a condition into the target object, with the target portion as a base point.

4. The environment recognition device according to claim 2, wherein the target object grouping unit regards the relative distance of the target portion which is grouped as a representative distance, and further groups another target portion satisfying a condition into the target object, with the target portion as a base point.

5. The environment recognition device according to claim 1, wherein the representative distance is a relative distance that corresponds to a peak of a distance distribution of the relative distances of the target portions in the target object.

6. The environment recognition device according to claim 2, wherein the representative distance is a relative distance that corresponds to a peak of a distance distribution of the relative distances of the target portions in the target object.

7. The environment recognition device according to claim 1, wherein the representative distance is an average value of the relative distances of target portions in the target object.

8. The environment recognition device according to claim 2, wherein the representative distance is an average value of the relative distances of target portions in the target object.

9. An environment recognition method comprising:
obtaining luminance values of target portions existing in a detection area;
obtaining a relative distance of each of the target portions from a vehicle on which the environment recognition method is being executed;
provisionally determining a specific object corresponding to each of the target portions from luminance values of the target portions on the basis of association between luminance ranges and specific objects, the association being retained in a data retaining unit;
grouping adjacent target portions provisionally determined to correspond to a same specific object as a target object;
deriving a representative distance that is a representative value of the relative distance of target portions in the target object; and
grouping another target portion into the target object, when differences in a horizontal direction and a vertical direction between the another target portion and the target object fall within a first predetermined range and a difference between a relative distance of the another target portion from the vehicle and the representative distance of the target object falls within a second predetermined range, and when a luminance value of the another target portion corresponds to the luminance of the target object.

10. The environment recognition device according to claim 1, further comprising a specific object determining unit that determines a specific object based on the target object grouped by the target object grouping unit.

* * * * *